United States Patent
Watanabe

[11] Patent Number: 5,927,895
[45] Date of Patent: Jul. 27, 1999

[54] CABLE ANCHORING APPARATUS

[75] Inventor: Mitsuhiro Watanabe, Yamanashi-ken, Japan

[73] Assignee: Mitsui Kinzoku Kogyo Kabushiki Kaisha, Tokyo, Japan

[21] Appl. No.: 08/896,068

[22] Filed: Jul. 17, 1997

[30] Foreign Application Priority Data

Jul. 19, 1996 [JP] Japan ................... 8-207653

[51] Int. Cl.⁶ ............................................ B25G 3/00
[52] U.S. Cl. ........................ 403/353; 24/669; 24/702; 74/502.6
[58] Field of Search ............................. 403/315, 316, 403/319, 326, 329, 353, 150, 152; 24/669, 702, 664, 662, 116 A; 74/502.4, 502.6

[56] References Cited

U.S. PATENT DOCUMENTS 2,628,855  2/1953  Cushman ........................ 403/152
4,069,721  1/1978  Ezaki et al. .

Primary Examiner—Lynne A. Reichard
Assistant Examiner—David E. Bochna
Attorney, Agent, or Firm—Browdy and Neimark

[57] ABSTRACT

A cable anchoring apparatus for detachably attaching a wire cable to a movable member comprises a cable head fixed to the wire cable, a substantially semi-circular-shaped hook formed in the movable member and engageable with the cable head, and a retainer fixed on the movable member. The hook has a first slit and a space for accommodating the cable head. The retainer has an opening overlapped with the space, a notch for communicating the opening to an outside of the retainer, a pair of claws with a sufficient elasticity, and a second slit formed between the claws and communicated with the notch. The gap of the notch and the gap of the second slit are substantially equal to the gap of the first slit. A path is formed between an edge of the opening and the claws and is narrower than the diameter of the cable head. The claws extend distantly from the space.

4 Claims, 4 Drawing Sheets

CABLE ANCHORING APPARATUS

FIELD OF THE INVENTION

The present invention relates to a cable anchoring apparatus, and more particularly to a cable anchoring apparatus for detachably attaching a cable head of a wire cable to a movable member.

PRIOR ART

FIG. 1 shows a prior art cable anchoring apparatus which comprises a cylindrical or spherical cable head A fixed to a wire cable B, and a semi-circular-shaped hook C formed in a movable member D and detachably engaged with the head A. This prior art apparatus is characterized by very easy mounting or anchoring and simple structure, however, this apparatus is also characterized by a problem that the head A is liable to come out of the hook C when the cable B is loosened during use.

On the other hand, U.S. Pat. No. 4,069,721 has disclosed, as shown in FIG. 2, a cable anchoring apparatus having a retainer E for holding the head A in the hook C. An elastic claw F of the retainer E extends toward the hook C so that after the head A is forced into a gap G formed between the claw F and the hook C against an elastic force of the claw F, the head A does not come out of the hook C even if the cable A is loosened.

A problem of the latter anchoring apparatus is that it is inconvenient to detach the head A from the hook C. When pulling the head A in the direction of arrow H in order to detach the head A from the hook C, there is a possibility that the claw F is crushed at this time because the claw F extends toward the hook C. Accordingly, a careful work is required. Further, if the anchoring apparatus is attached in a small place and it is difficult to pull the head A in the direction of the arrow H, it is necessary to pushing up the cable B in the direction of arrow J to detach the head A from the hook C. However, this work is very troublesome.

U.S. Pat. No. 4,069,721 has also disclosed, as shown in FIG. 3, a cable anchoring apparatus having another retainer E. However, this apparatus is poor in operability when attaching the head A to the hook C.

SUMMARY OF THE INVENTION

It is therefore an object of the present invention to provide an improved cable anchoring apparatus which makes it possible to detach a cable head without damaging a claw of a retainer and makes it possible to easily detach the cable head from a hook even in a limited place.

BRIEF DESCRIPTION OF THE DRAWINGS

The above and other objects, features and advantages of the present invention will become apparent from the detailed description of the preferred embodiments found below with reference to the accompanying drawings in which.

DESCRIPTION OF THE PREFERRED EMBODIMENTS

Figure 1:
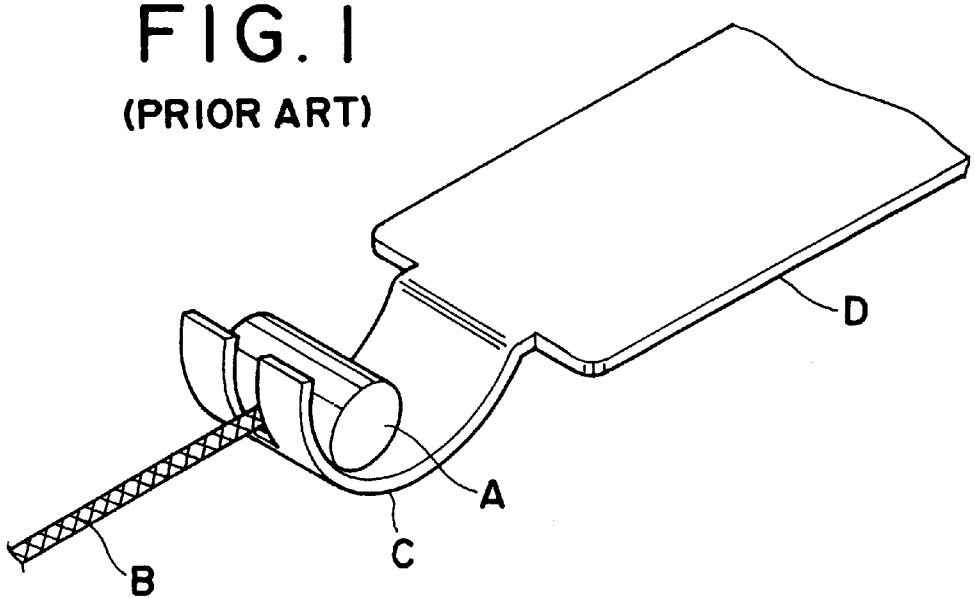
FIGS. 1 to 3 respective show a conventional cable anchoring apparatus of the prior art.
Figure 2:
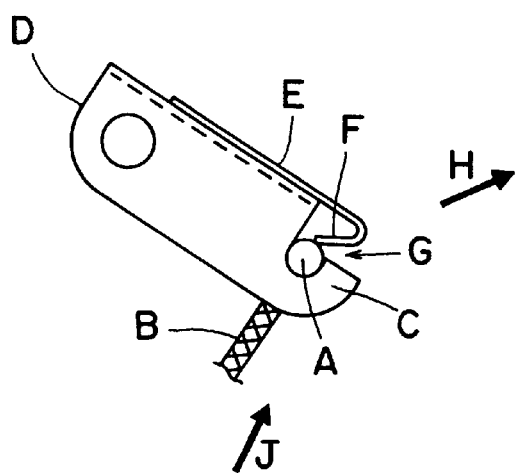
Figure 3:
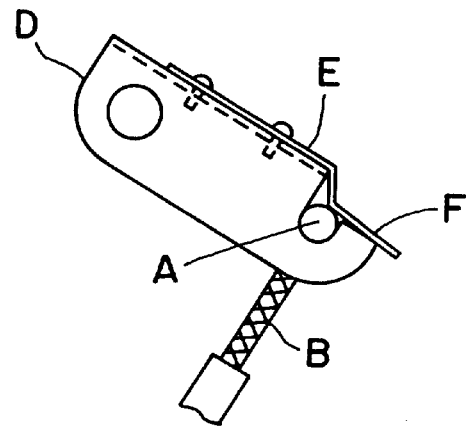
Figure 4:
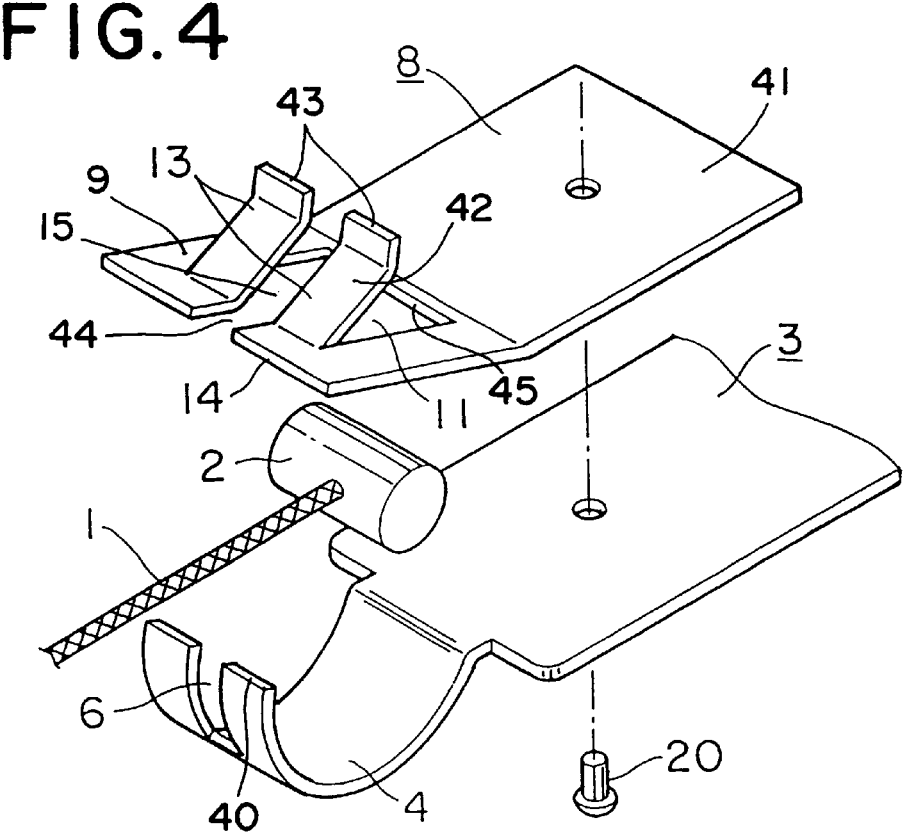
FIG. 4 is an exploded view of a cable anchoring apparatus of the present invention.
Figure 5:
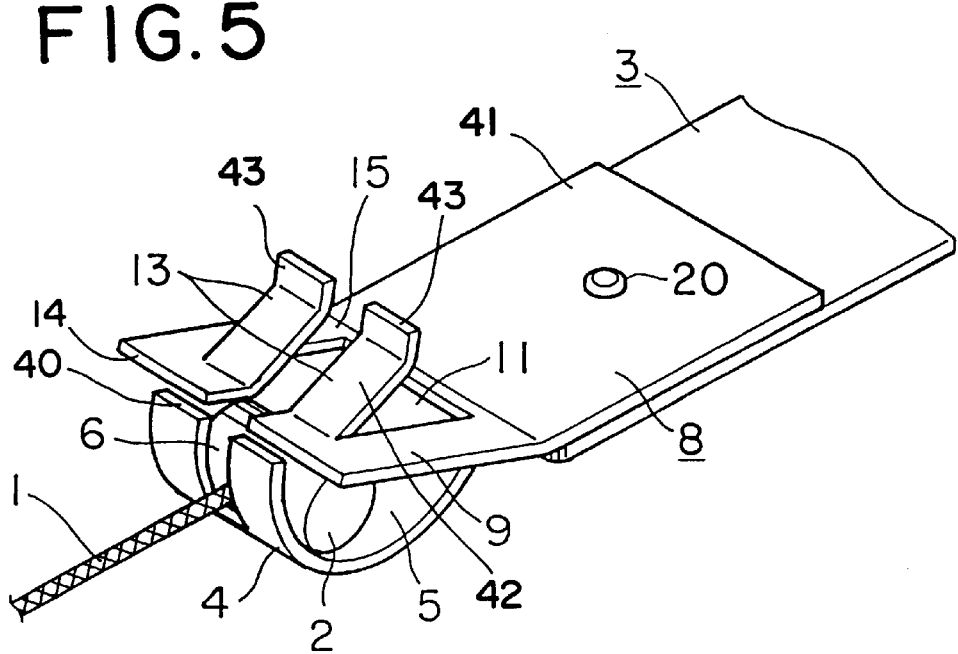
FIG. 5 is a perspective view of the cable anchoring apparatus of the present invention.
Figure 6:
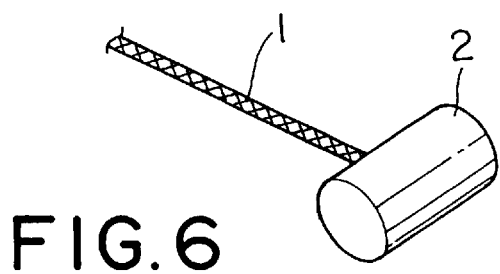
FIG. 6 is an enlarged perspective view of a cable head.

As shown in FIGS. 4 and 5, a cable anchoring apparatus according to the present invention comprises a wire cable 1 which is to be connected to a driving member (not shown) such as an electric motor, and a movable member 3 which is to be connected to a driven member (not shown) such as a door latch of the vehicle. The wire cable 1 has a cable head 2 at one end thereof which is formed into a cylindrical or spherical shape.

Figure 7:
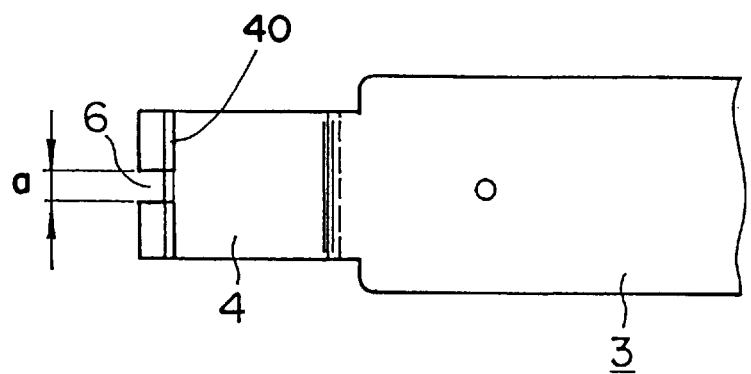
FIG. 7 is a plan view of a movable member.
Figure 8:
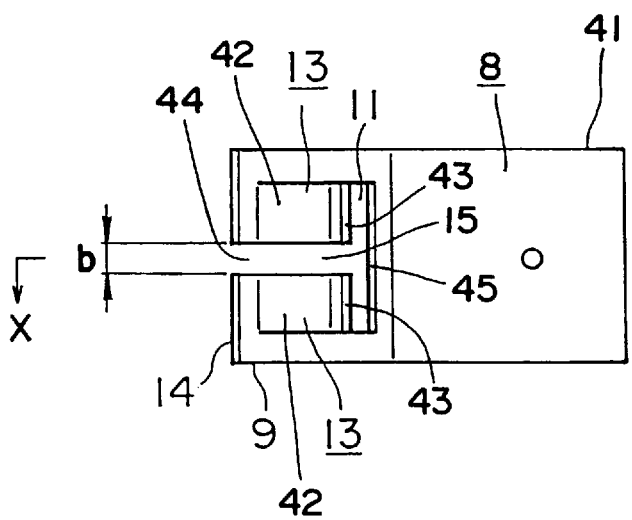
FIG. 8 is a plan view of a retainer.
Figure 9:
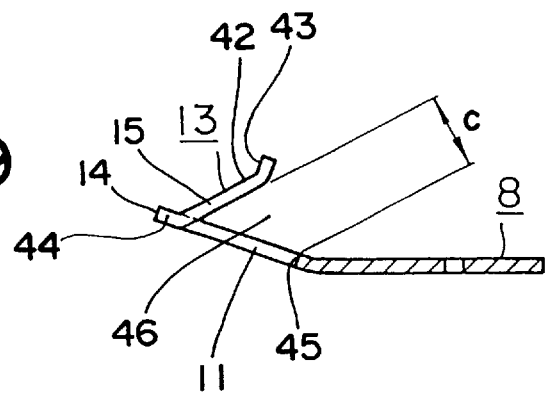
FIG. 9 is a sectional view taken along line X—X of FIG. 8.

The movable member 3 has a hook 4 with which the head 2 is engageable. The hook 4 is formed into a substantially semi-circular shape, and has a space 5 inside thereof enough to accommodate the head 2. At a tip end portion of the hook 4 is provided a slit 6 which is opened to the outside at a tip end 40 of the hook 4. A gap or distance a (FIG. 7) of the slit 6 is narrower than a diameter of the head 2, but wider than a diameter of the cable 1.

A retainer 8 with a sufficient elasticity has a base part 41 which is fixed to the movable member 3 by means of a screw or rivet 20. A tip end 14 of the retainer 8 extends to a position near the tip end 40 of the hook 4 so that a gap between the tip end 14 and the tip end 40 is narrower than the diameter of the head 2. The retainer 8 has a part 9 which is overlapped with the hook 4 (space 5). A pair of claws 13, 13 are formed on the overlapping part 9 by stamping the part 9 in the shape of "E". Each of the claws 13, 13 extends distantly from the slit 6 of the hook 4, and has a slope 42 inclined by an angle of about 45 degrees to the plane of the overlapping part 9 and a cambered part 43 which is formed at the tip end of the slope 42 and is substantially perpendicular to the plane of the overlapping part 9.

An opening 11 is formed in the overlapping part 9 by bending the claws 13, 13. The opening 11 is so large enough that the head 2 can pass through it, and is opened to the outside of the retainer 8 through a notch 44 formed at the tip end 14 of the retainer 8. A gap b of the notch 44 is substantially equal to the gap a of the slit 6. Between a base side edge 45 of the opening 11 and the claws 13 is defined a path 46 through which the head 2 passes. The minimum width c of the path 46 is made smaller enough than the diameter of the head 2 so that the claws 13, 13 may be elastically deformed by the head 2 when the head 2 passes through the path 46.

A slit 15 is formed between the claws 13, 13 and is linked to the notch 44. A gap of the slit 15 is made equal to the gap b of the notch 44 so that no difference in level may appear between these gaps.

Figure 10:
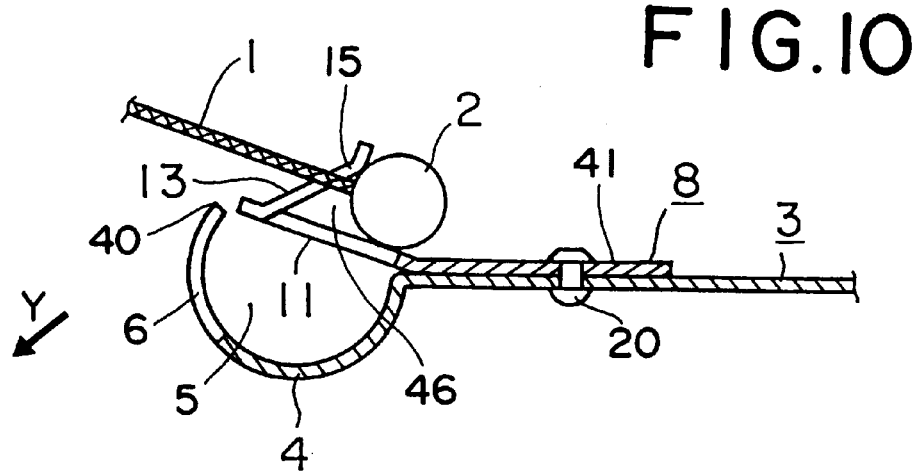
FIG. 10 is a sectional view showing a state where the cable head is brought into contact with a claw of the retainer.
Figure 11:
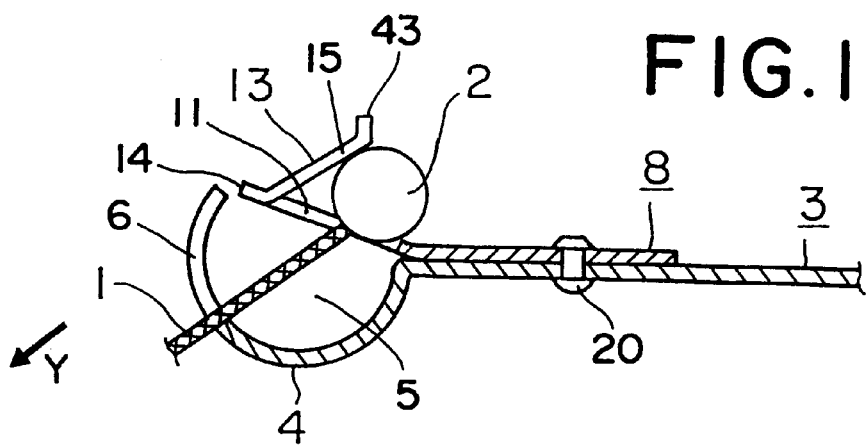
FIG. 11 is a sectional view showing a state where the claw is deformed by the contact with the cable head.
Figure 12:
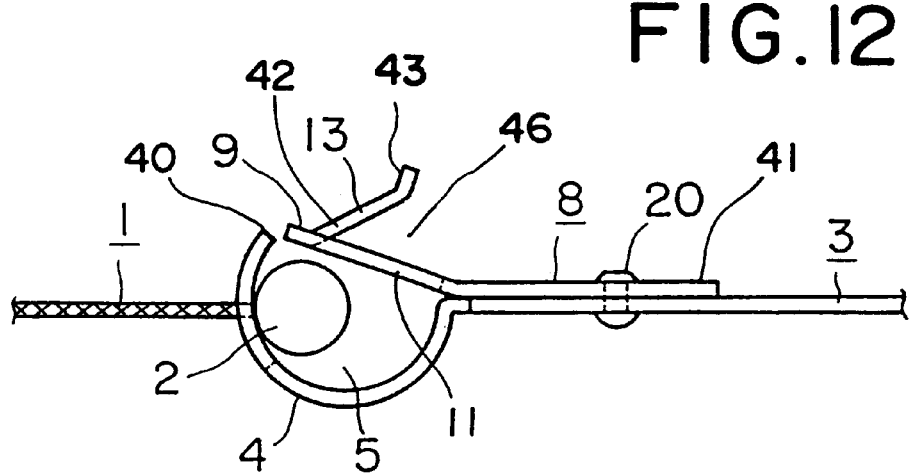
FIG. 12 is a side view showing a state where the cable head is engages with a hook of the movable member.

In case of coupling the cable 1 with the movable member 3, the head 2 is hitched on the claws 13 and 13 as shown in FIG. 10 after inserting the cable 1 into the slit 15 between the claws 13 and 13 and into the slit 6 of the hook 4. Then, when pulling the cable 1 in the direction of arrow Y, since the path 46 between the edge 45 of the opening 11 and the claws 13 is narrower than the diameter of the head 2, the head 2 enters the path 46 as elastically deforming the claws 13 as shown in FIG. 11 and is accommodated in the space 5 of the hook 4 through the opening 11.

The head 2 which has engaged with the hook 4 does not come off from the hook 4 even if the cable 1 is loosened since the claws 13 keep the path 46 narrow.

In case of detaching the head 2 from the hook 4, when turning the cable 1 by 180 degrees and then pulling it in the direction opposite to the arrow Y, the claws 13 are elastically deformed and the head 2 is easily detached from the hook 4. At this time, since the claws 13 and 13 extend distantly from the hook 4, they are smoothly deformed without an effort by touching the head 2. Accordingly, the claws 13 and 13 are prevented from being damaged.

According to a place where the anchoring apparatus is used and an area of its surroundings, it is sometimes difficult to turn the cable 1 by 180 degrees. In such a case, when the claws 13 are bent by pinching the cambered parts 43 of the claws 13 with fingers, a pair of pliers or the like in order to widen the path 46 and the cable 1 is then pushed up in the direction opposite to the arrow Y as being kept in this state, thereby the head 2 can be easily detached from the hook 4 even in a limited place.

What is claimed is:

1. A cable anchoring apparatus detachably attaching a wire cable to a movable member, said apparatus comprising:

a cable head fixed at an end part of the wire cable;

a substantially semi-circular-shaped hook formed in the movable member and engageable with the cable head, said hook having a first slit provided with a gap through which the wire cable can pass but the cable head cannot pass, and a space large enough to accommodate the cable head;

a retainer fixed on the movable member for holding the cable head in the space, said retainer having an opening overlapped with the space, a notch for communicating the opening to an outside of the retainer, a pair of elastically deformable claws, and a second slit formed between the claws and communicated with the notch, a gap of the notch and a gap of the second slit being substantially equal to the gap of the first slit; and a path formed between an edge of the opening and the claws, said path being narrower than the diameter of the cable head so that the claws are elastically deformed by the cable head when the cable head passes through the path;

wherein said claws extend away from the space.

2. A cable anchoring apparatus according to claim 1, wherein said opening is disposed between the path and the space.

3. A cable anchoring apparatus according to claim 2, wherein said first slit is formed at a tip end portion of the hook, said notch is positioned between the first slit and the second slit, and said claws extend away from the first slit.

4. A cable anchoring apparatus according to claim 3, wherein a cambered part is formed at a tip end of each of said claw.

* * * * *